(12) United States Patent
Elsner

(10) Patent No.: US 7,819,365 B2
(45) Date of Patent: Oct. 26, 2010

(54) FASTENING DEVICE FOR CABLES

(75) Inventor: Markus Elsner, Kaiserslautern (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 373 days.

(21) Appl. No.: 12/009,751

(22) Filed: Jan. 22, 2008

(65) Prior Publication Data

US 2008/0229550 A1 Sep. 25, 2008

(30) Foreign Application Priority Data

Jan. 22, 2007 (DE) .................. 20 2007 000 938 U

(51) Int. Cl.
*F16L 3/08* (2006.01)
*F16L 3/12* (2006.01)

(52) U.S. Cl. .................... 248/74.3; 248/74.1; 248/74.2; 248/65; 248/73; 24/16 PB; 24/339; 24/555

(58) Field of Classification Search .............. 248/74.3, 248/74.1, 74.2, 65, 73; 24/16 PB, 339, 555
See application file for complete search history.

(56) References Cited

U.S. PATENT DOCUMENTS

| 3,113,754 A | | 12/1963 | Jansson | |
| 3,192,584 A | * | 7/1965 | Pape | 24/16 PB |
| 3,562,870 A | * | 2/1971 | Sund | 24/16 PB |
| 3,632,070 A | | 1/1972 | Thayer | |
| 3,875,618 A | * | 4/1975 | Schuplin | 24/16 PB |
| 4,498,507 A | * | 2/1985 | Thompson | 140/93.2 |
| 4,993,669 A | * | 2/1991 | Dyer | 248/61 |
| 6,128,809 A | * | 10/2000 | Khokhar | 24/168 |
| 6,532,631 B2 | * | 3/2003 | Rohaly et al. | 24/16 PB |
| 6,550,723 B2 | * | 4/2003 | Fraley et al. | 248/74.3 |
| 6,928,701 B2 | * | 8/2005 | Hutter, III | 24/16 PB |
| 7,207,529 B2 | * | 4/2007 | Rosemann et al. | 248/71 |

FOREIGN PATENT DOCUMENTS

| DE | 20202548 | 6/2002 |
| DE | 10332376 | 2/2005 |
| DE | 202005019375 | 3/2006 |
| DE | 202006001743 | 5/2006 |
| EP | 0288896 | 11/1988 |
| GB | 1005269 | 9/1965 |
| JP | 11196522 | 7/1999 |

OTHER PUBLICATIONS

German Product Catalog entitled "HellermannTyton" 2007/2008, pp. 69-71 Kabelbundel-und Befestigungssysteme.
British Product Catalog entitle "HellermannTyton" 2007/2008, pp. 108-110.

* cited by examiner

*Primary Examiner*—Terrell Mckinnon
*Assistant Examiner*—Michael McDuffie
(74) *Attorney, Agent, or Firm*—Tarolli, Sundheim, Covell & Tummino LLP

(57) ABSTRACT

A fastening device for cables includes an edge clip part (20) for mounting the fastening device on an edge (10) of a base part, a metal piece (14) which is inserted into the edge clip part (20), a cable band lock (18), and a cable band (16) which is able to be introduced into the cable band lock (18). The metal piece (14) has a tongue (44) projecting into the cable band lock (18). The tongue (44) engages on the cable band (16) when the cable band (16) is introduced.

9 Claims, 7 Drawing Sheets

FASTENING DEVICE FOR CABLES

TECHNICAL FIELD

The invention relates to a fastening device for cables.

BACKGROUND OF THE INVENTION

Various fastening devices are known, particularly in the automobile industry, by which individual cables or cable harnesses can be fixed to a sheet metal piece, for example. To mount the fastening device on the sheet metal piece, or generally to a base part, the latter usually has one or more openings, into which detent elements of the fastening device are pressed in. When laying cables, there is possibly a need for fixing cables at or along an edge of a base part.

It is an object of the invention to provide a fastening device which is able to be produced at a favourable cost and which is simple to install, yet making possible a very reliable cable fixing relative to an edge of a base part.

BRIEF SUMMARY OF THE INVENTION

According to the invention, a fastening device for cables includes an edge clip part for mounting the fastening device on an edge of a base part, a metal piece which is inserted into the edge clip part, a cable band lock, and a cable band which is able to be introduced into the cable band lock. The metal piece has a tongue projecting into the cable band lock. The tongue engages on the cable band when the cable band is introduced. The fastening device according to the invention is placed—with or without cable tied in—simply onto the edge of the base part. The metal tongue, which engages on the cable band after the cable band is introduced into the cable band lock, provides for a distinctly increased withdrawal force compared with cable ties having a conventional cable band detent mechanism of pure plastic, i.e. the cable band is better secured against unintentional withdrawal. This can be explained in that in conventional cable ties, the cable band and cable band lock are produced from the same plastic which, on the one hand, allows a sufficiently slight bending of the cable band, but on the other hand limits the resistance against withdrawal because of this flexibility.

Preferably, the edge clip part, the cable band lock and the cable band are produced integrally (as a single piece) from (one) plastic, so that the number of individual parts of the fastening device is reduced to a minimum. Only the metal piece is produced separately.

For a particularly simple assembly of the fastening device, the edge clip part has an opening through which the metal piece can be inserted into the edge clip part. The opening is preferably provided on the side of the edge clip part, which is opposite a mounting gap of the edge clip part.

In order to efficiently counteract an unintentional withdrawal of the fastening device from the edge of the base part, the metal piece has at least one sheet metal claw which engages directly on the base part when the fastening device is mounted. In this case, the metal piece has a dual function: firstly, the tongue secures the cable band, secondly the sheet metal claw arrests the fastening device on the base part.

The metal piece has at least one positioning portion for positioning and securely fastening the metal piece in the edge clip part, the positioning portion holding the metal piece in the edge clip part in a defined position, or at least has a detent hook which engages into a corresponding detent window of the edge clip part.

In order to limit the path of insertion for the metal piece in the edge clip part, the edge clip part has a holding portion which forms a stop for the metal piece. The holding portion of the edge clip part is preferably constructed as a hook, a portion of the metal piece engaging behind the holding portion.

For particular applications, it is advantageous for the cable band to extend substantially perpendicularly to a mounting direction before being introduced into the cable band lock, the mounting direction being defined by the edge clip part.

DETAILED DESCRIPTION OF THE PREFERRED EMBODIMENT

Figure 1:
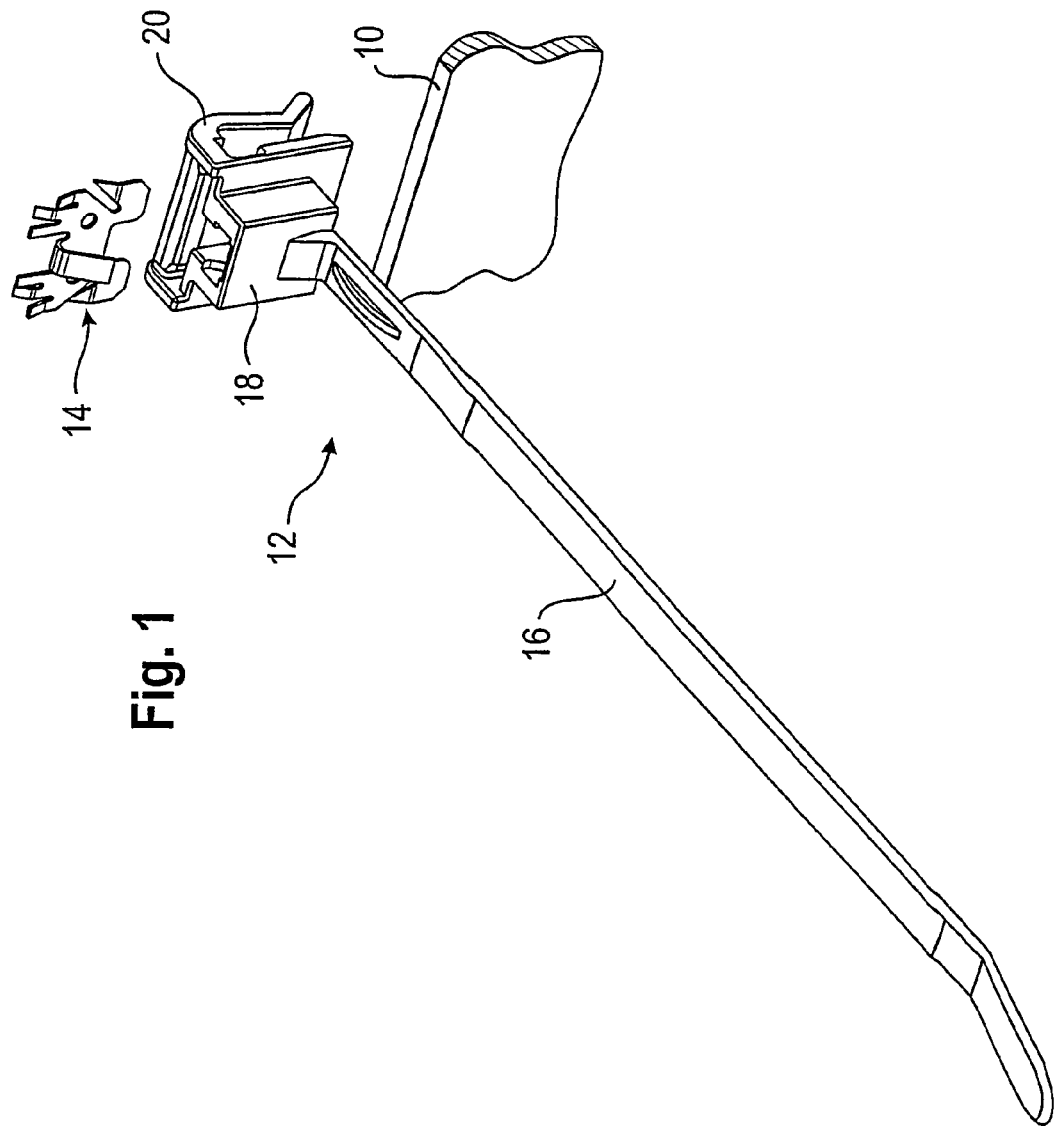
FIG. 1 shows an exploded view of a fastening device according to the invention.

FIG. 1 depicts the individual parts of a fastening device according to the invention, which serves for fixing a cable or cable harness to a mounting edge 10 of a base part. The base part may for example be a sheet metal piece or a part of the body of a motor vehicle. In addition to a plastic piece 12, the construction of which will be explained in further detail, the fastening device also has a metal piece 14.

The plastic piece 12, which is produced in one-piece, can be subdivided into three functional sections: a cable band 16 which is placed around the cable or cables which is/are to be fixed; a cable band lock 18 into which the cable band 16 is introduced for fixing the cable or cables; and an edge clip part 20 for mounting the fastening device on the edge 10 of the base part.

Figure 2:
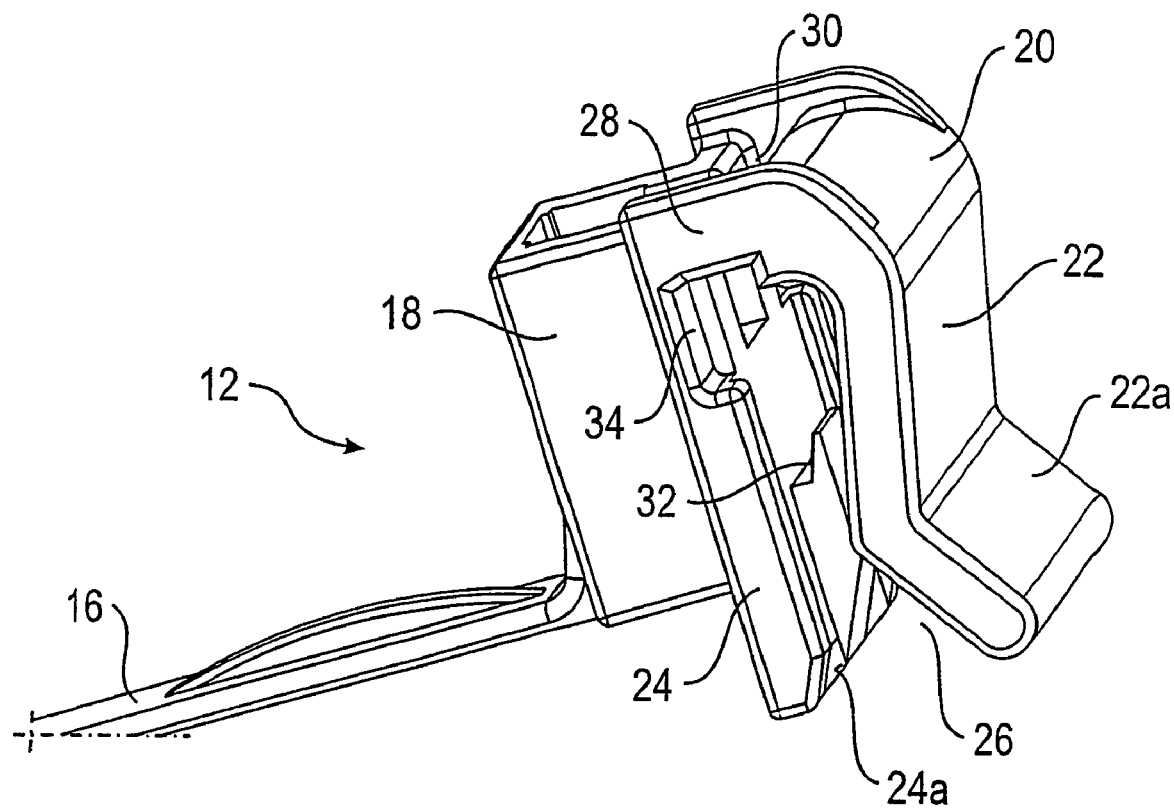
FIG. 2 shows a perspective view of the edge clip part.

In FIG. 2, further details of the plastic piece 12 can be seen. The cable band lock 18 is formed substantially by a duct which is open on both end sides. The cable band 16 extends substantially perpendicularly from the duct. The U-shaped edge clip part 20 includes two arms 22, 24 and joins on at the other side of the cable band lock 18. The arms 22, 24 define a mounting gap 26 and are connected with each other on the opposite side by connecting portions 28 which serve as a stop for the edge 10 of the base part. The first arm 22, facing away form the cable band lock 18, has an angled section 22a which, together with the chamfered end 24a of the second arm 24, facilitates the mounting onto the edge 10. In addition, the first arm 22 is constructed so that it is able to be deflected elastically, and after mounting onto the edge 10 it exerts an elastic force thereon.

Figure 3:
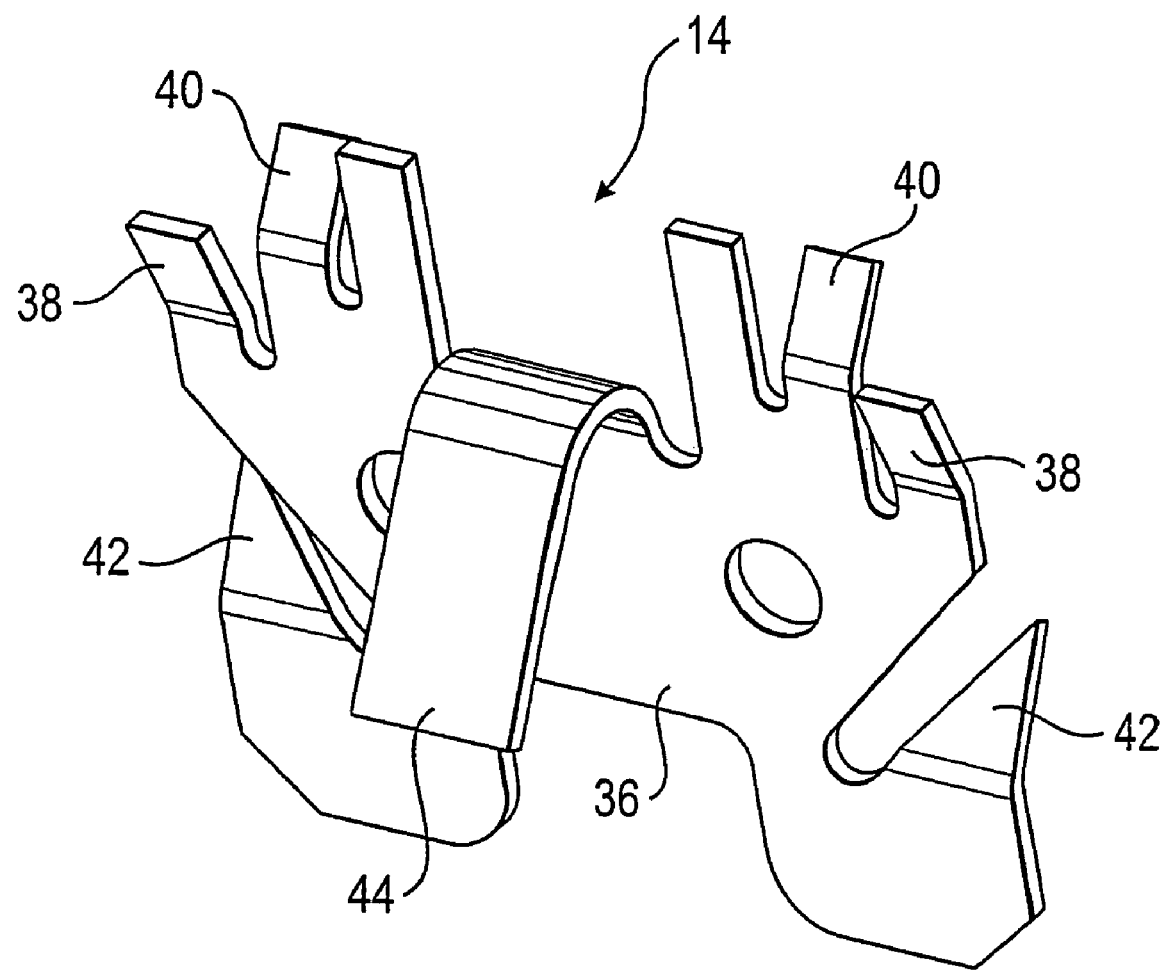
FIG. 3 shows a perspective view of the metal piece.

Furthermore, the plastic piece 12 has an opening 30 on the side opposite the mounting gap 26, through which opening 30 the metal piece 14, which is shown individually in FIG. 3, can be inserted into the edge clip part 20. The edge clip part 20 is matched specifically to the metal piece 14 and has a holding portion 32 which is constructed in the manner of a hook and serves as a stop for the metal piece 14, and also has two detent windows 34, the significance of which will be explained further below.

The metal piece 14 (see FIG. 3) is formed from a flat metal plate and has a base portion 36, from which two detent hooks 38, two positioning portions 40 and two sheet metal claws 42 extend. The detent hooks 38 are inclined in a first direction, the positioning portions 40 are inclined in an opposite, second direction, and the claws 42 are inclined in the same direction as the positioning portions 40. In addition, the metal piece 14 has a tongue 44 which is bent over in the first direction.

Figure 4:
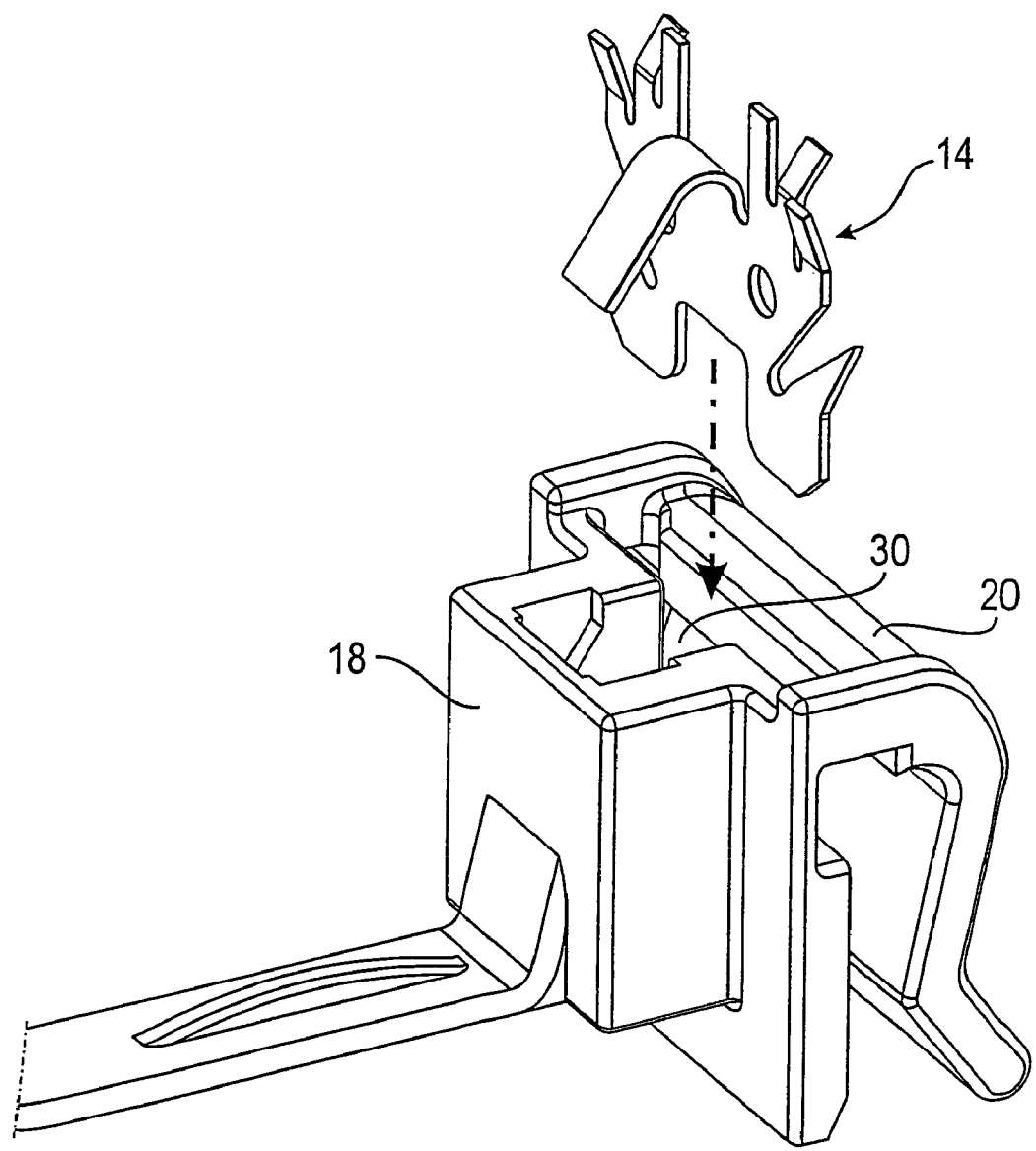
FIG. 4 shows a perspective view of the edge clip part and of the metal piece.
Figure 5B:
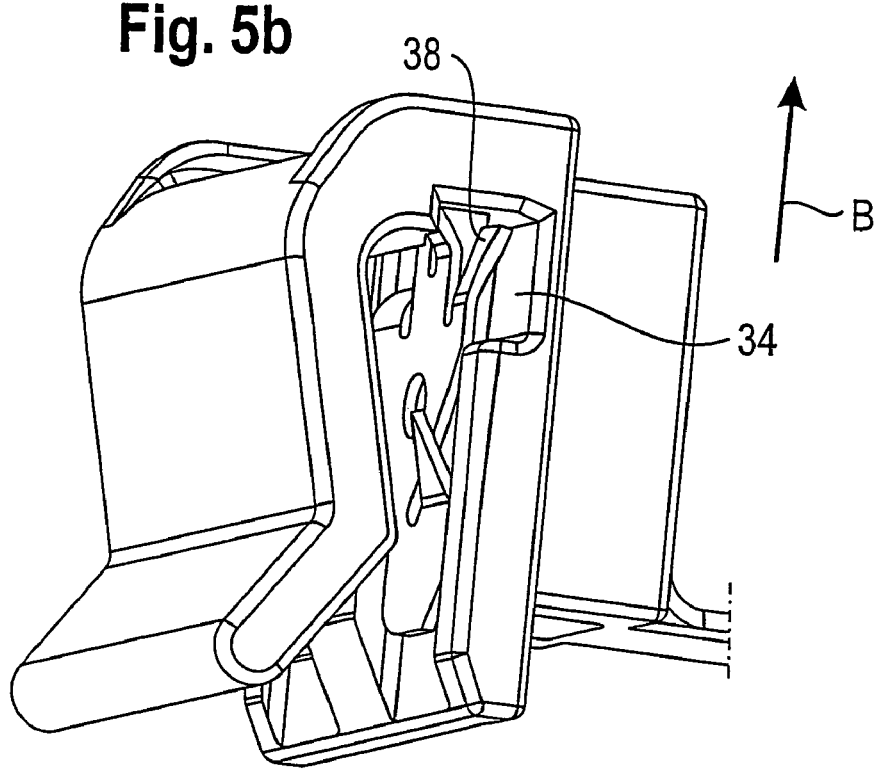
FIGS. 5a, 5b, 5c show various perspective views of the edge clip part with an inserted metal piece.
Figure 5A:
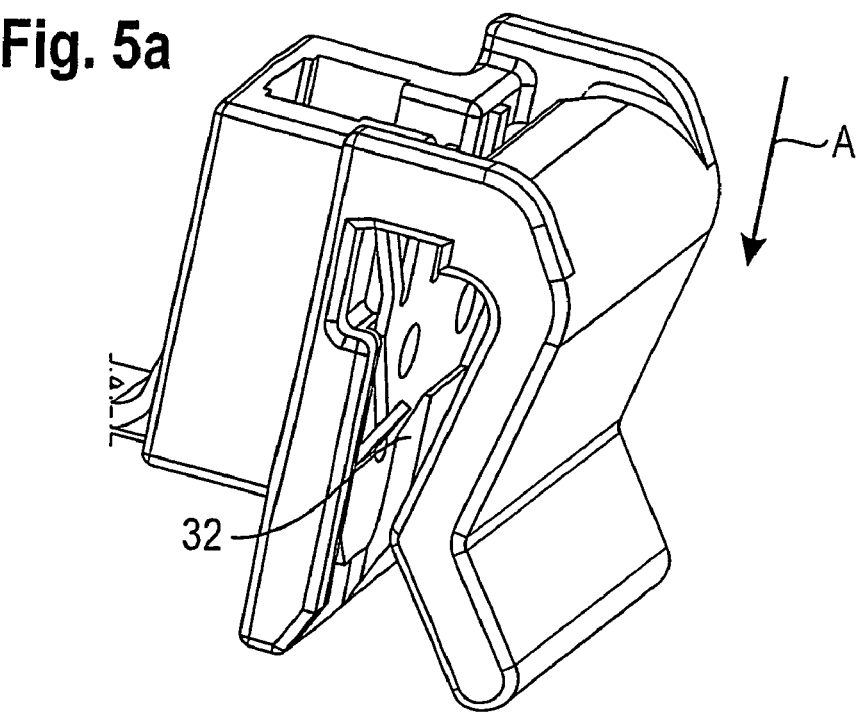
Figure 5C:
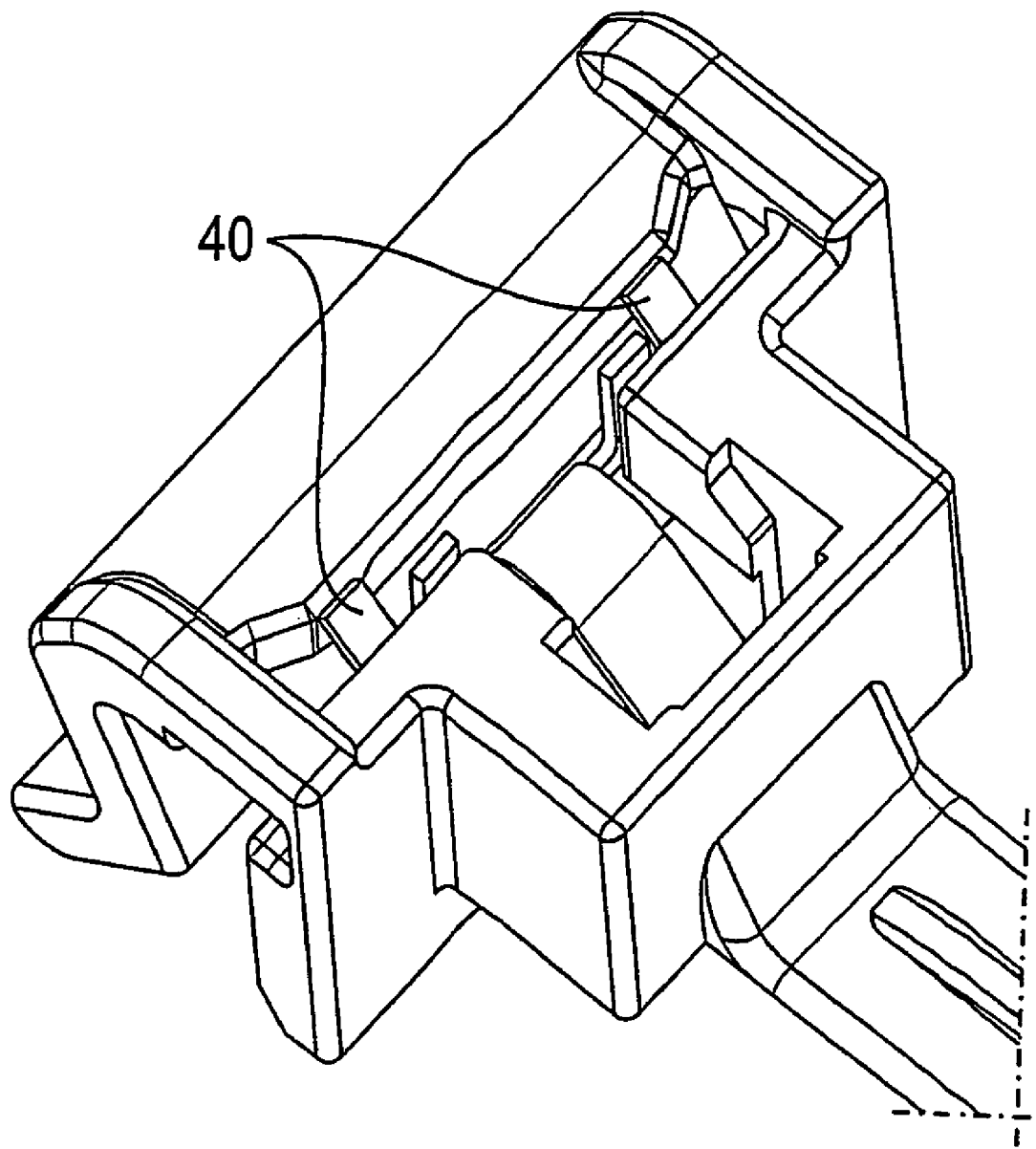

In FIG. 4 it is shown how the metal piece 14 is inserted through the opening 30 into the edge clip part 20 of the plastic piece 12. FIGS. 5a, 5b and 5c show the plastic piece 12 with the metal piece 14 fully inserted. Whilst the metal piece 14 is being pushed in, the holding portion 32 of the edge clip part 20 serves as a stop, and the base portion 36 of the metal piece 14 engages behind the hook-like holding portion 32 (FIG. 5a). The movement of the metal piece 14 in the insertion direction A is thereby restricted.

In addition, whilst the metal piece 14 is being pushed in, the detent hooks 38 engage into the detent window 34 of the plastic piece 12, so that the metal piece 14 also sits securely with respect to direction B, which is opposed to the insertion direction A (FIG. 5b). The positioning portions 40 press the metal piece 14 in the edge clip part 20 into a predetermined position and make provision that the metal piece 14 maintains this defined position (FIG. 5c).

Figure 6:
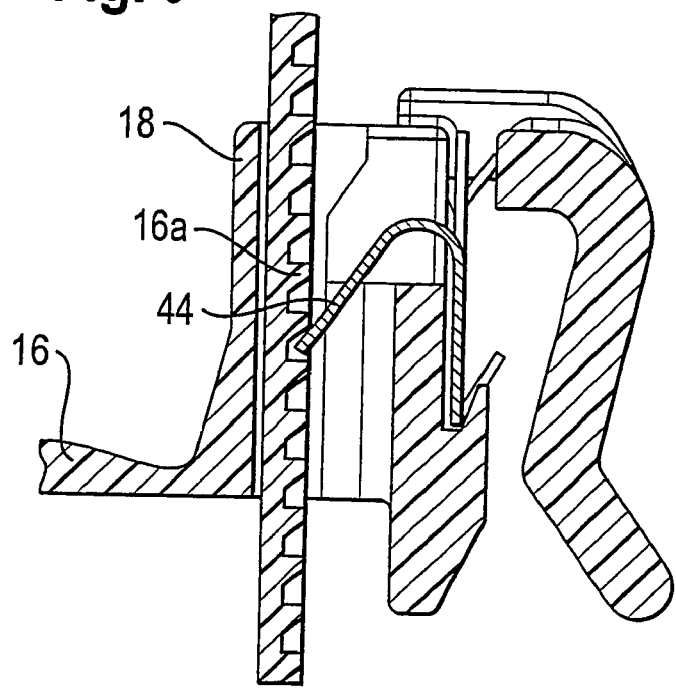
FIG. 6 shows a sectional view of the fastening device with an inserted metal piece and with a cable band having been introduced.

In FIG. 6 it can be seen that the tongue 44 of the metal piece 14 projects into the cable band lock 18 and engages directly on the cable band 16 when the latter is introduced into the cable band lock 18. In a known manner, the cable band 16 has a sawtooth-like profile 16a. Owing to the much higher rigidity of the metal tongue 44 compared with the material of the plastic piece 12, the cable band 16 is still held securely in the cable band lock 18 even in the case of very high withdrawal forces.

Figure 7:
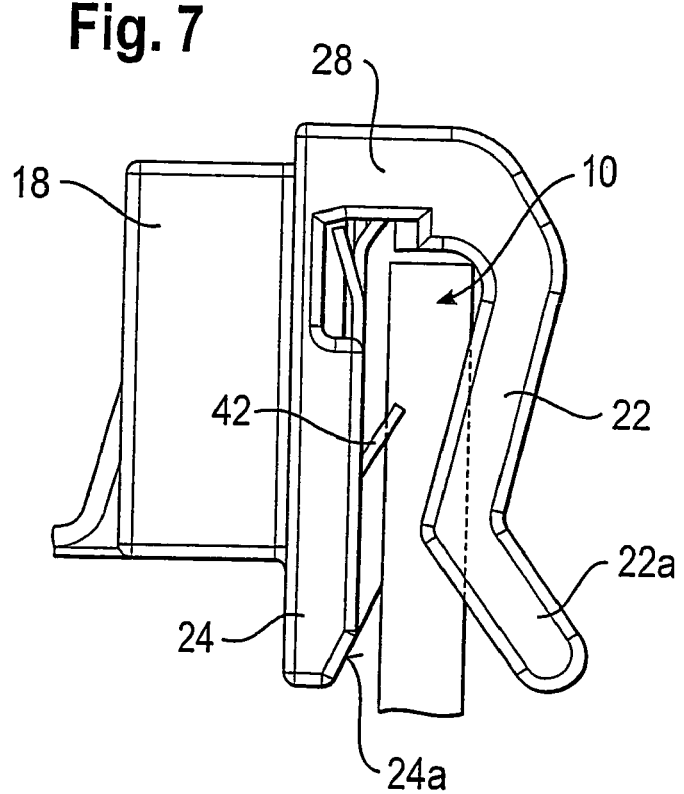
FIG. 7 shows a side view of the mounted fastening device.

Finally, FIG. 7 shows the fastening device after it has been mounted onto the edge 10 of the base part (the first arm 22 of the edge clip part 20 being illustrated in the non-deflected state). The sheet metal claws 42 facing away from the cable band lock 18 engage directly on the side of the base part facing the second arm 24, and thus prevent an unintentional withdrawal of the fastening device from the edge 10 of the base part.

When laying cable, depending on the circumstances, either firstly the cable/cable harness can be fixed to the fastening device by laying the cable band 16 around the cable/cable harness and introducing the cable band 16 into the cable band lock 18, or firstly the fastening device is mounted on the base part by placing it onto the edge 10.

The invention claimed is:

1. A fastening device for cables, the fastening device including an edge clip part for mounting the fastening device on an edge of a base part, a metal piece which is inserted into the edge clip part, a cable band lock, and a cable band which is able to be introduced into the cable band lock, the metal piece having a tongue projecting into the cable band lock and at least one sheet metal claw which engages directly on the base part when the fastening device is mounted, the tongue engaging on the cable band when the cable band is introduced.

2. The fastening device according to claim 1, wherein the edge clip part, the cable band lock and the cable band are produced integrally from plastic.

3. The fastening device according to claim 1, wherein the edge clip part has an opening through which the metal piece can be inserted into the edge clip part.

4. The fastening device according to claim 3, wherein the edge clip part has a mounting gap on one side, and the opening for the metal piece is provided on an opposite side.

5. The fastening device according to claim 1, wherein the metal piece has at least one positioning portion which holds the metal piece in the edge clip part in a defined position.

6. A fastening device for cables, the fastening device including an edge clip part for mounting the fastening device on an edge of a base part, a metal piece which is inserted into the edge clip part, a cable band lock, and a cable band which is able to be introduced into the cable band lock, the metal piece having a tongue projecting into the cable band lock and at least one detent hook which engages into a corresponding detent window of the edge clip part, the tongue engaging on the cable band when the cable band is introduced.

7. The fastening device according to claim 1, wherein the edge clip part has a holding portion which forms a stop for the metal piece.

8. A fastening device for cables, the fastening device including an edge clip part for mounting the fastening device on an edge of a base part, a metal piece which is inserted into the edge clip part, a cable band lock, and a cable band which is able to be introduced into the cable band lock, the metal piece having a tongue projecting into the cable band lock, the tongue engaging on the cable band when the cable band is introduced, the edge clip part having a holding portion that is constructed as a hook and forms a stop for the metal piece, a portion of the metal piece engaging behind the holding portion.

9. The fastening device according to claim 1, wherein the edge clip part defines a mounting direction, the cable band extending substantially perpendicularly to the mounting direction before introduction into the cable band lock.

* * * * *